(12) United States Patent
Kang

(10) Patent No.: US 10,802,342 B2
(45) Date of Patent: Oct. 13, 2020

(54) DISPLAY DEVICE

(71) Applicant: SAMSUNG ELECTRONICS CO., LTD., Suwon-si (KR)

(72) Inventor: Ki Hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/068,284

(22) PCT Filed: Jan. 19, 2017

(86) PCT No.: PCT/KR2017/000671
§ 371 (c)(1),
(2) Date: Jul. 5, 2018

(87) PCT Pub. No.: WO2017/131391
PCT Pub. Date: Aug. 3, 2017

(65) Prior Publication Data
US 2019/0018288 A1    Jan. 17, 2019

(30) Foreign Application Priority Data

Jan. 25, 2016 (KR) .................. 10-2016-0008680

(51) Int. Cl.
*G02F 1/133* (2006.01)
*G02F 1/13357* (2006.01)
*G02F 1/1335* (2006.01)

(52) U.S. Cl.
CPC .. *G02F 1/133621* (2013.01); *G02F 1/133514* (2013.01); *G02F 1/133603* (2013.01)

(58) Field of Classification Search
None
See application file for complete search history.

(56) References Cited

U.S. PATENT DOCUMENTS

| | | |
|---|---|---|
| 2008/0013013 A1 | 1/2008 | Kim et al. |
| 2012/0069438 A1 | 3/2012 | Liu et al. |
| 2013/0050282 A1* | 2/2013 | Kim ............... G09G 3/3413 345/690 |

FOREIGN PATENT DOCUMENTS

| | | |
|---|---|---|
| KR | 10-2009-0109108 A | 10/2009 |
| KR | 10-2012-0026878 A | 3/2012 |
| KR | 10-2014-0002475 A | 1/2014 |

OTHER PUBLICATIONS

Search Report dated Apr. 24, 2017, issued by the International Searching Authority in International Application No. PCT/KR2017/000671 (PCT/ISA/210) English translation.

(Continued)

*Primary Examiner* — James A Dudek
(74) *Attorney, Agent, or Firm* — Sughrue Mion, PLLC

(57) ABSTRACT

Disclosed is a display device including a backlight unit for providing two or more different colors of light over time and a liquid crystal panel for representing colors by having the light efficiently penetrate the backlight unit.
In an embodiment, the display device includes a backlight unit, a liquid crystal panel configured to create an image by passing or blocking light emitted from the backlight unit, and a controller configured to control the backlight unit and the liquid crystal panel, wherein the liquid crystal panel includes a first color film in at least one of red, green, and blue colors, a second color film in a mixture of at least two of red, green, and blue colors, and a white film.

11 Claims, 13 Drawing Sheets

(56) References Cited

OTHER PUBLICATIONS

Written Opinion dated Apr. 24, 2017, issued by the International Searching Authority in International Application No. PCT/KR2017/000671 (PCT/ISA/237).

* cited by examiner

[Figure 1]
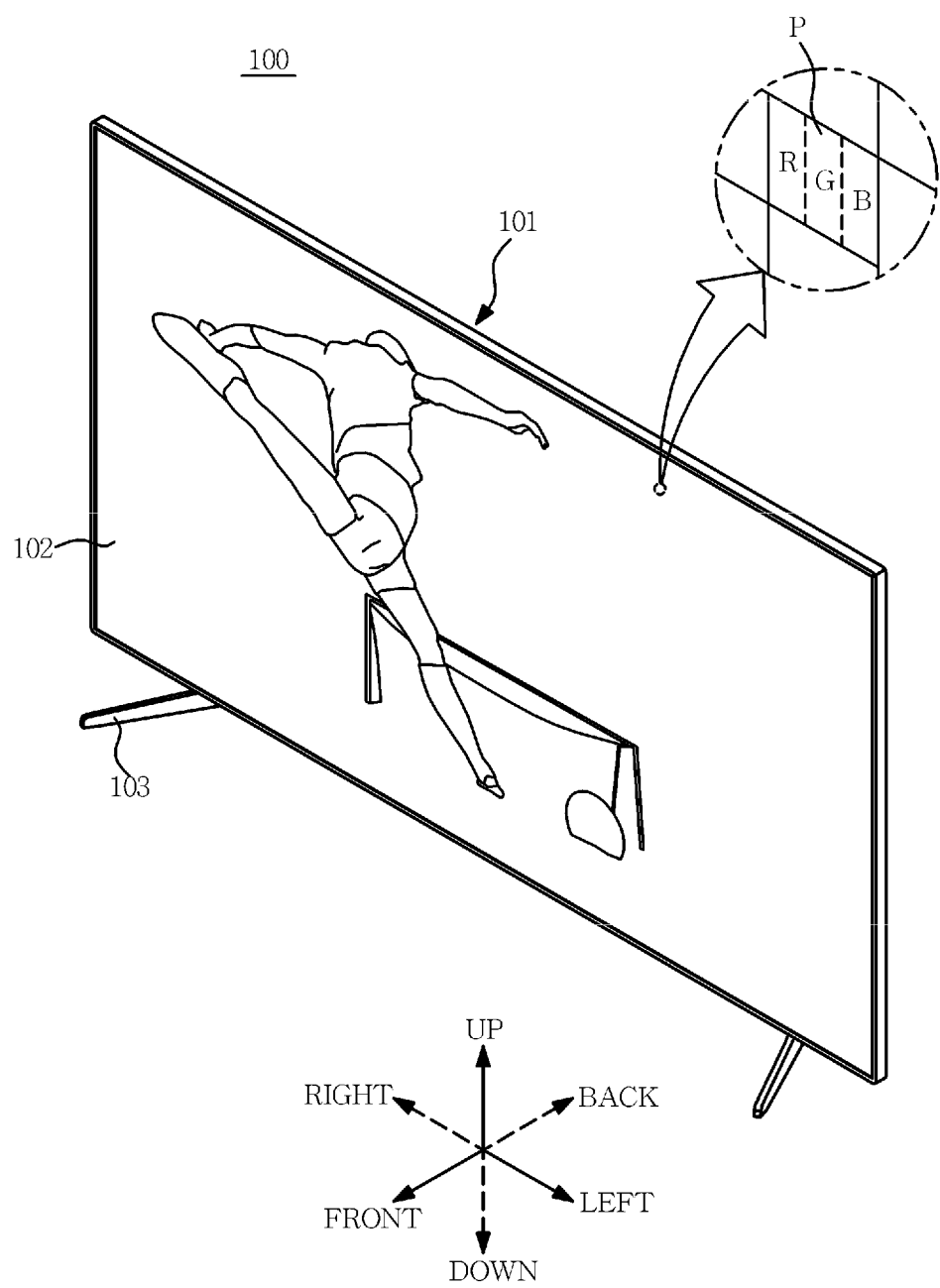

[Figure 2]
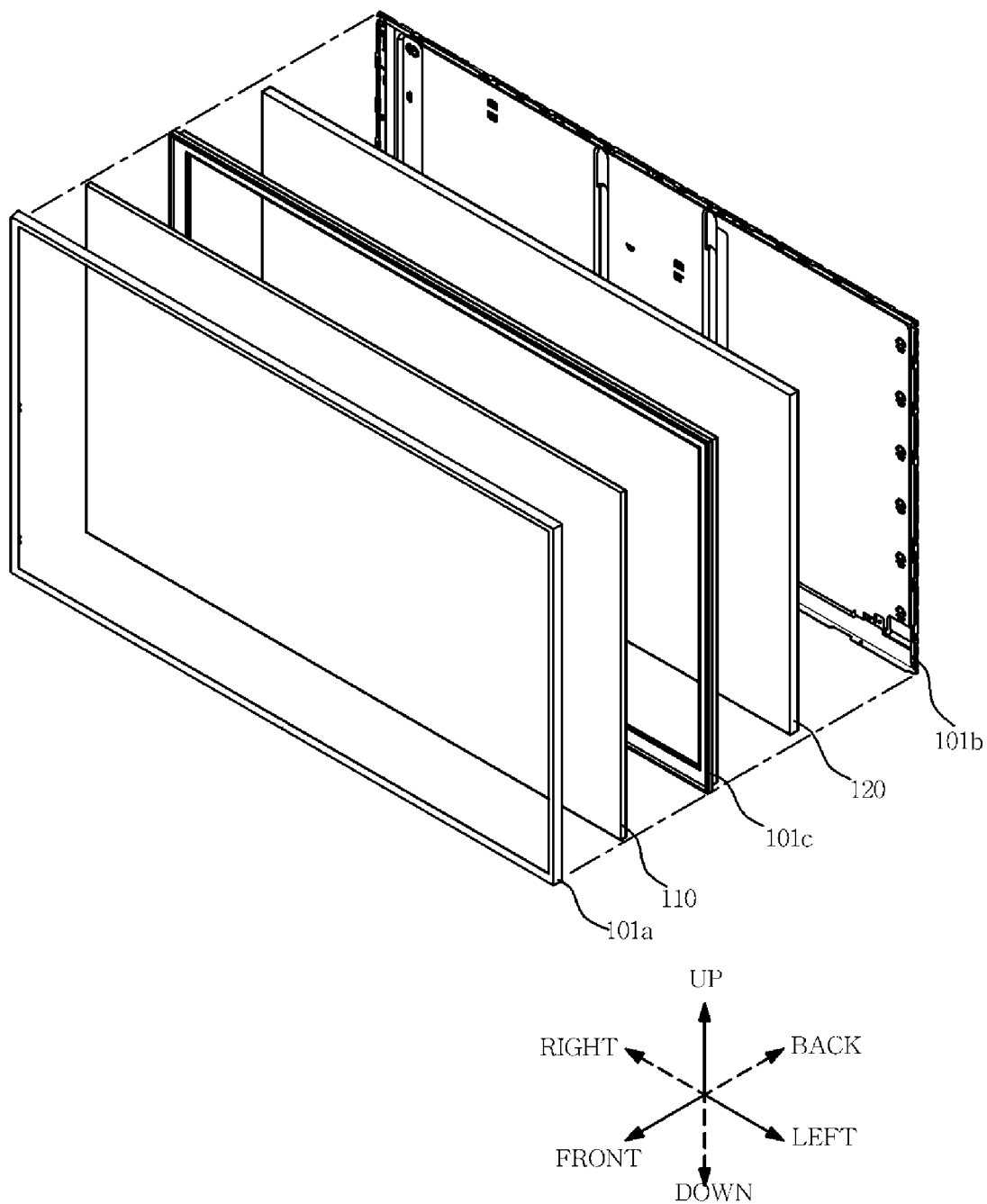

[Figure 3]
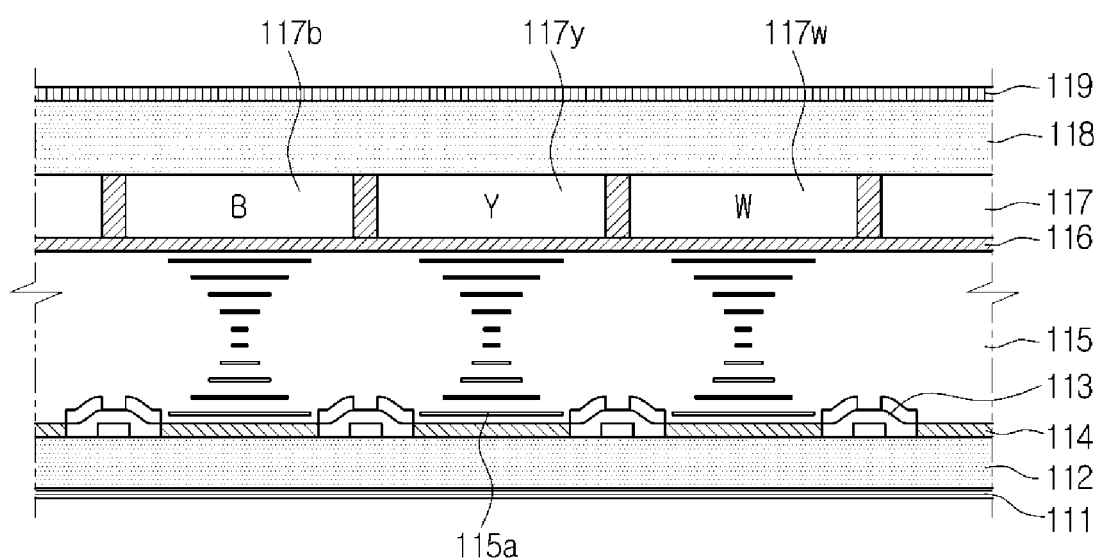

[Figure 4]
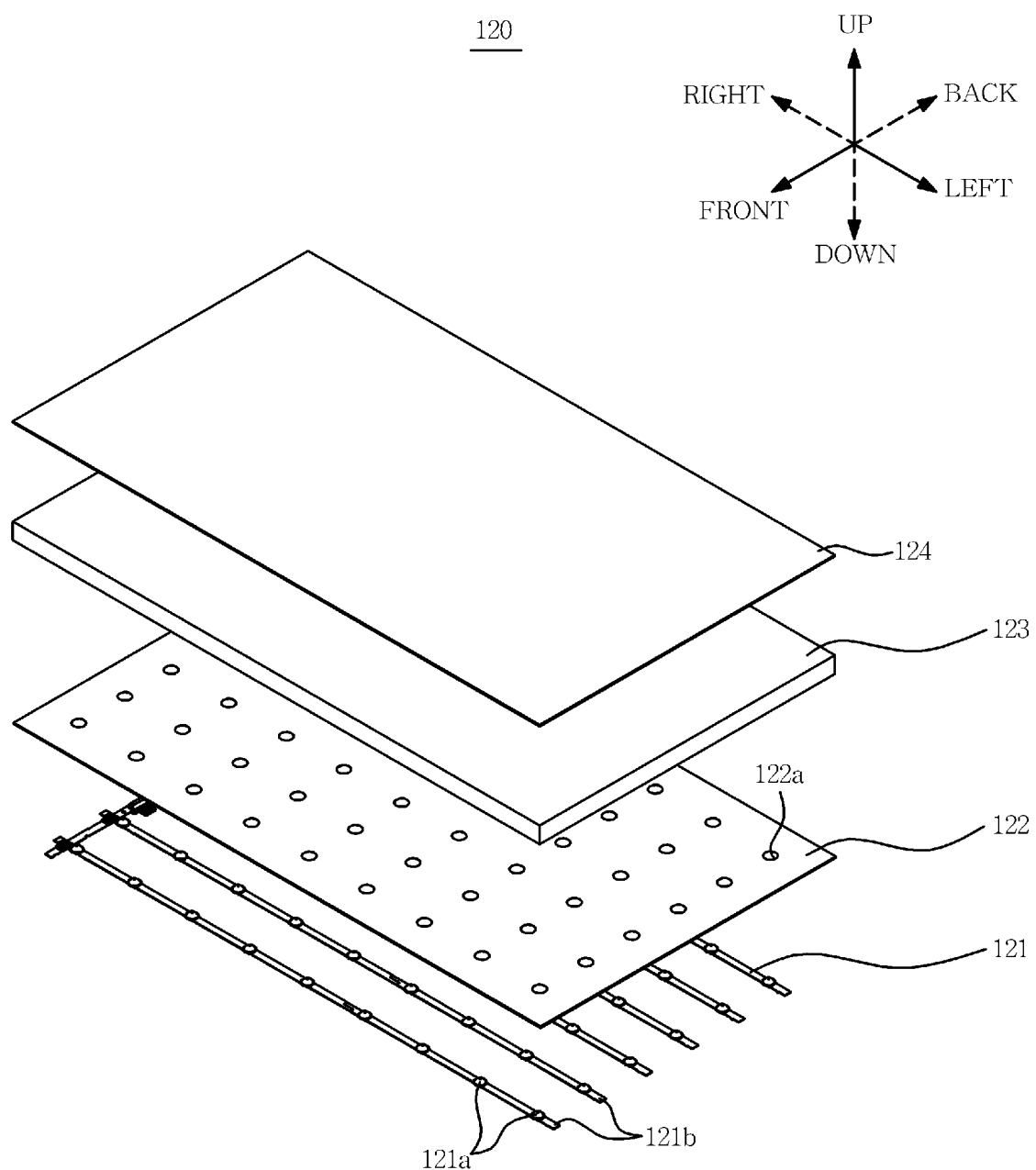

【Figure 5】
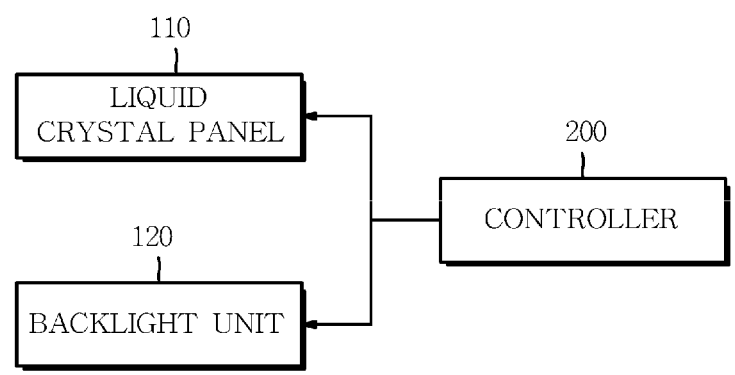

【Figure 6】
(a)
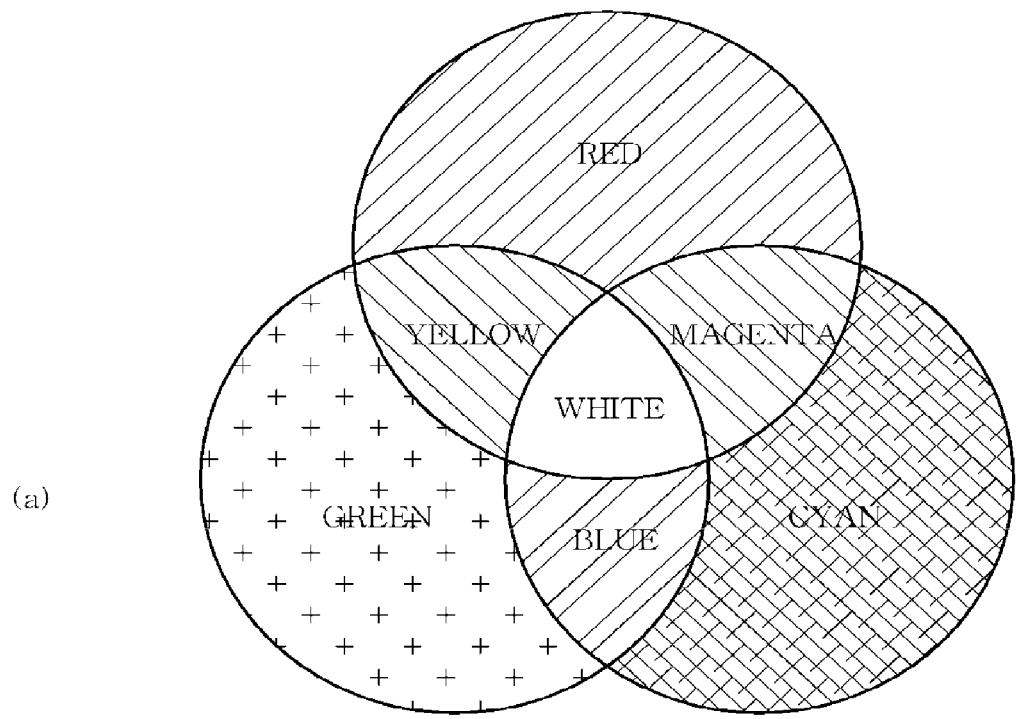
(b)
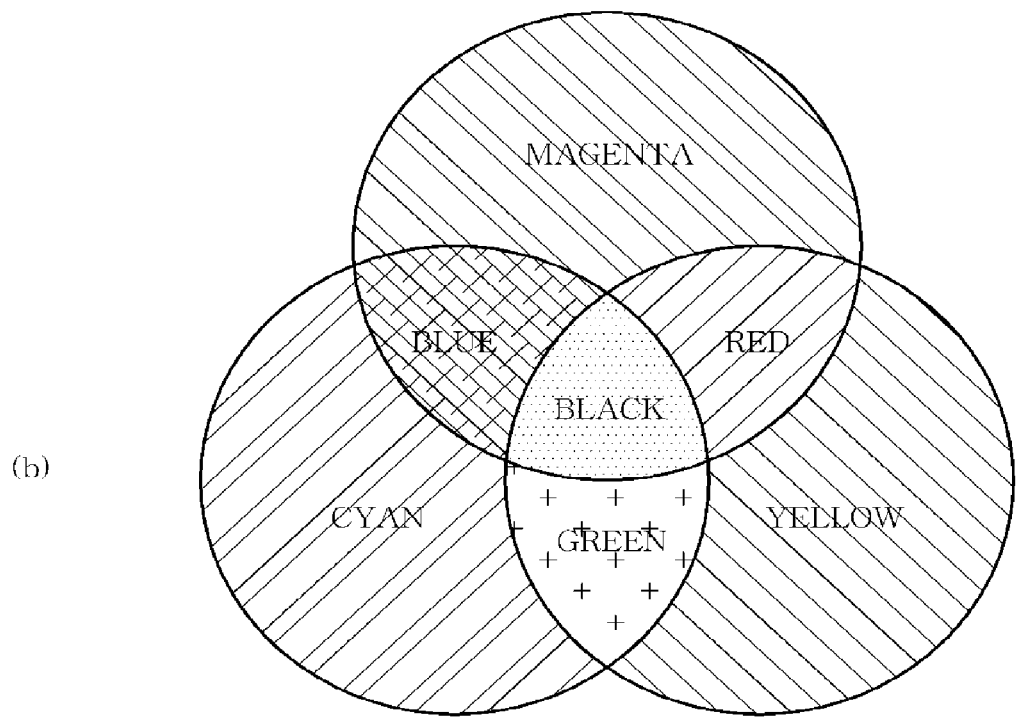

[Figure 7]
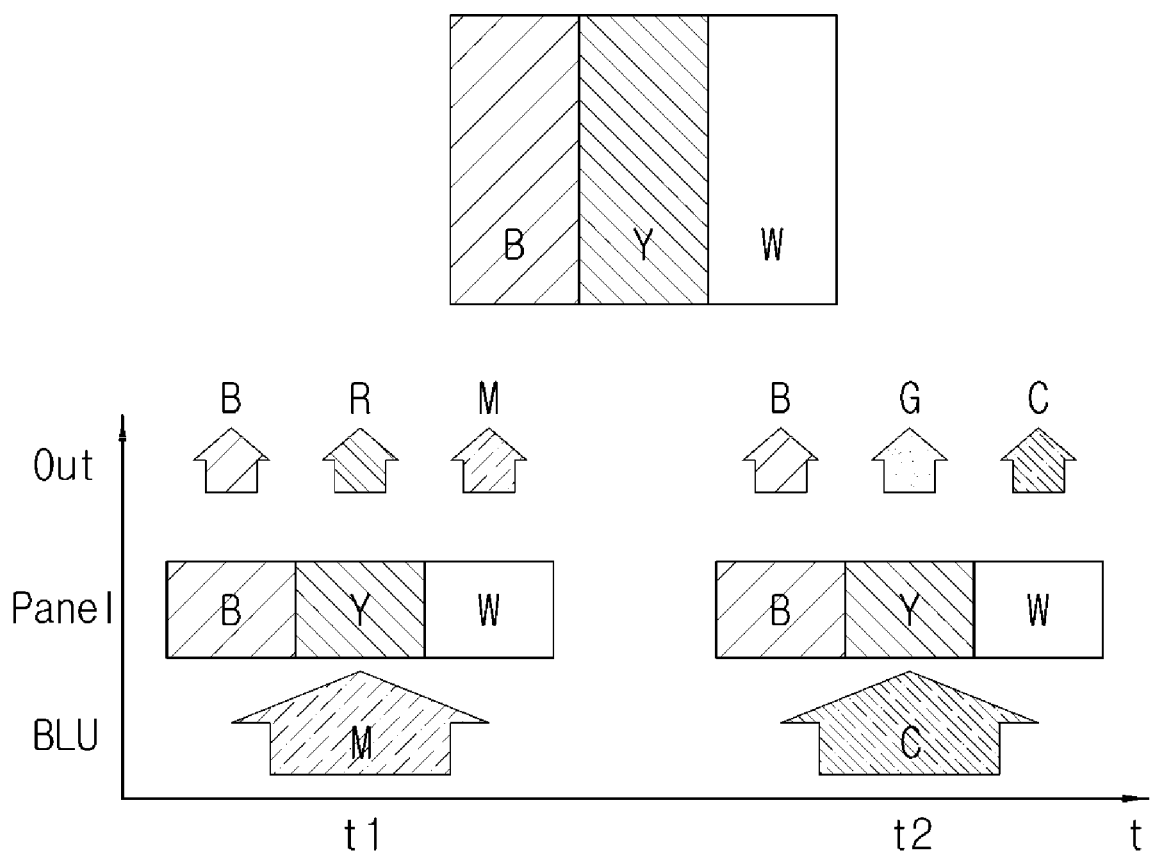

[Figure 8]
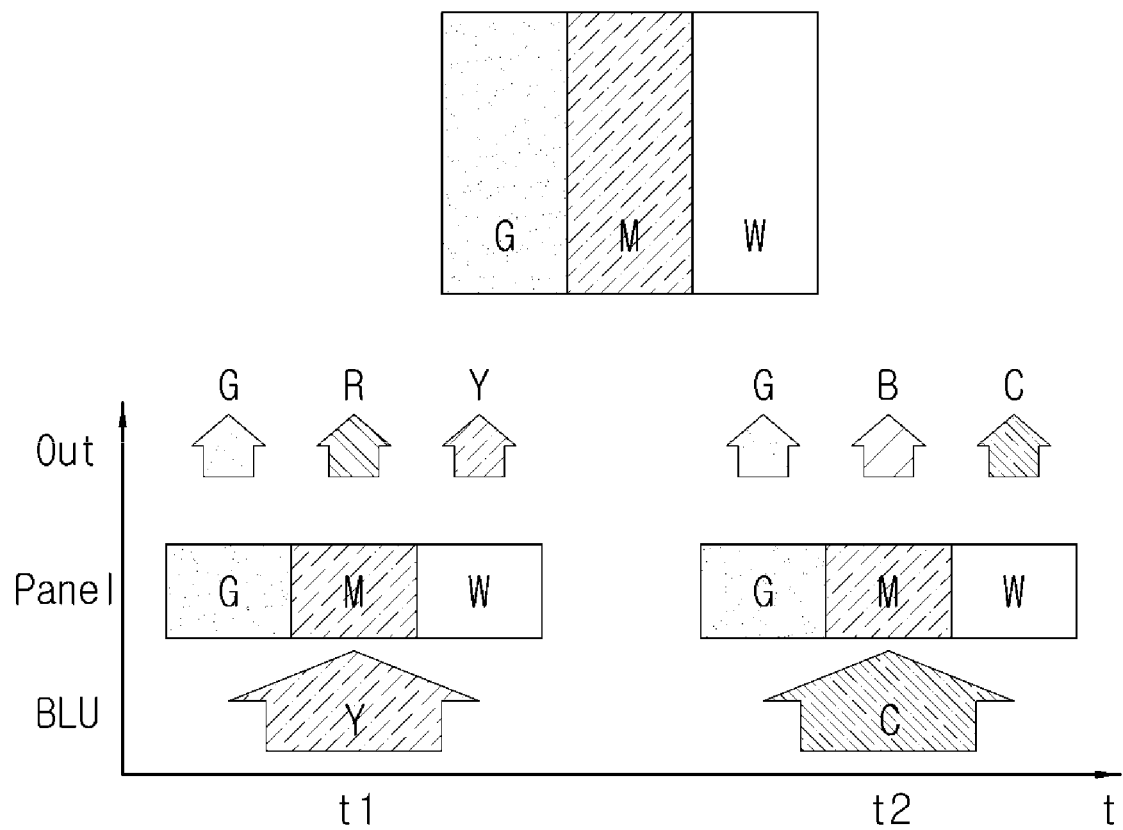

[Figure 9]
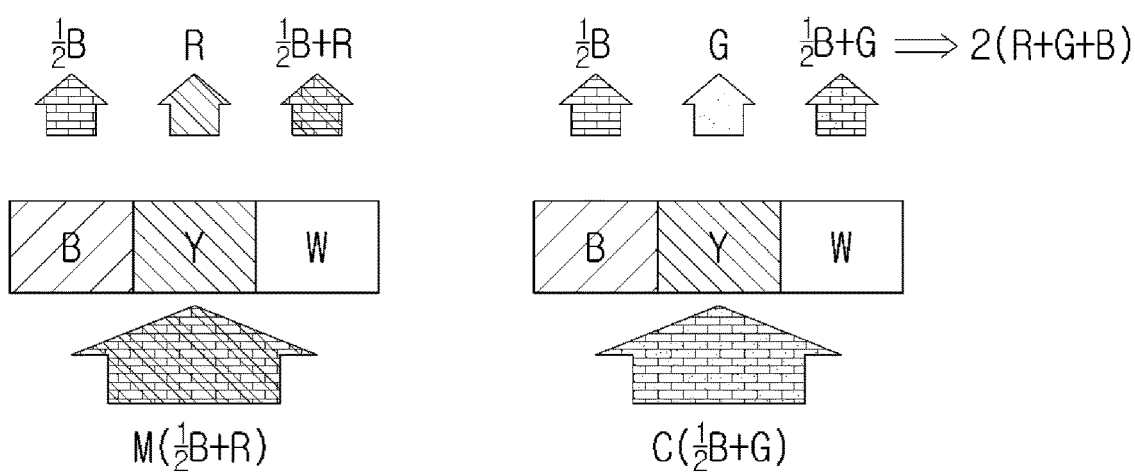

[Figure 10]
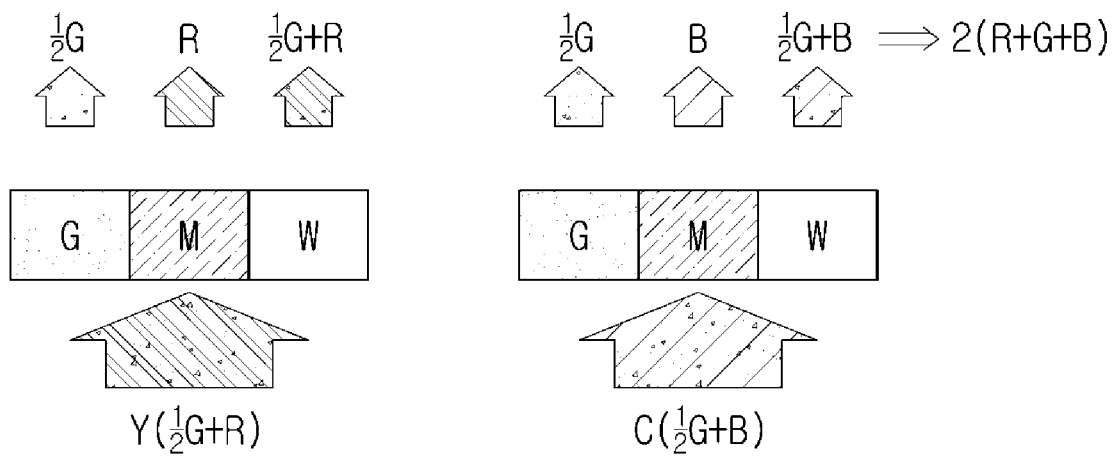

【Figure 11】
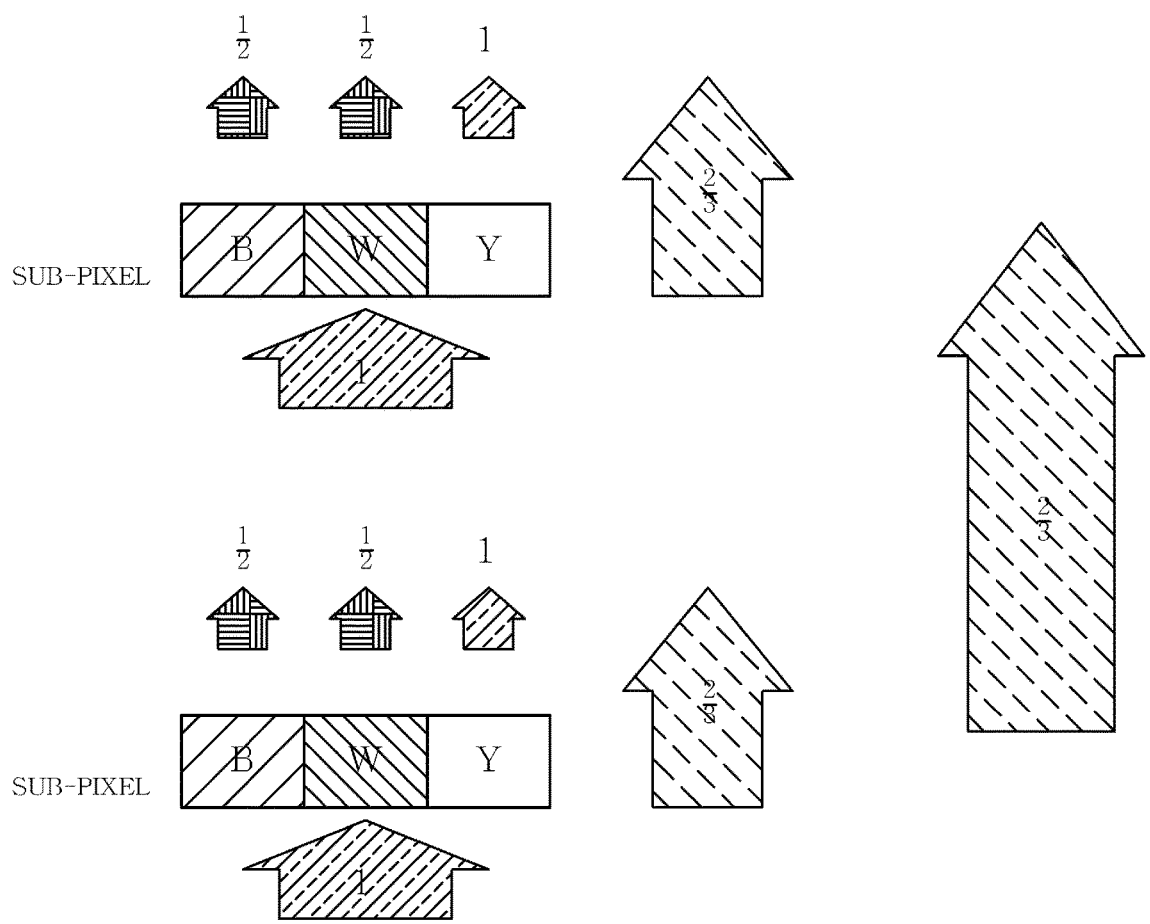

【Figure 12】
121
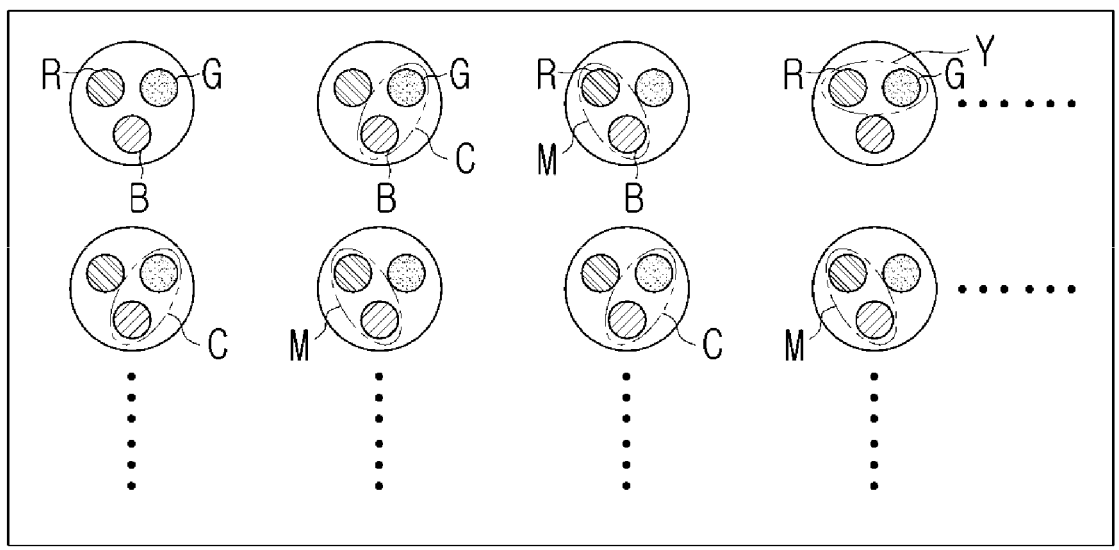

[Figure 13]
121
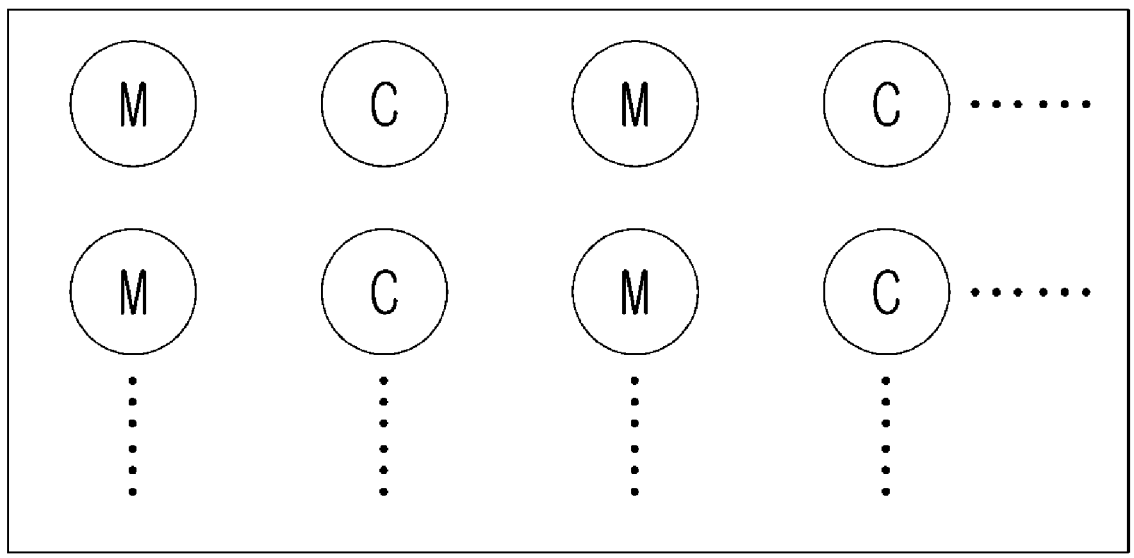

DISPLAY DEVICE

TECHNICAL FIELD

The present disclosure relates to a display device, and more particularly, to a liquid crystal panel and backlight unit.

BACKGROUND ART

Display devices are a type of output devices for displaying obtained or stored electrical information for the user by converting the electrical information to visual information, and are used in various fields such as homes or work places.

There are many different display devices such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, any other display device for reproducing images like advertisements or films, or other various kinds of audio/video systems.

The display device may use many different display means to display still images or moving images for the user. The display means may include cathode-ray tubes (CRTs), Light Emitting Diodes (LEDs), Organic LEDs (OLEDs), Active-Matrix OLEDs, liquid crystals or electronic paper.

A display device including the LCD panel further includes a backlight unit for emitting light to the rear side of the LCD panel, and the light emitted from the backlight unit comes in colors while penetrating color filters included in the LCD panel.

DISCLOSURE

Technical Problem

The present disclosure provides a display device including a backlight unit for providing two or more different colors of light over time and a liquid crystal panel for representing colors by having the light efficiently penetrate the backlight unit.

The present disclosure also provides a display device having three times higher efficiency as compared to the conventional RGB sub-pixel structure by configuring color filters included in the liquid crystal panel differently from the conventional technology and further increasing the efficiency by outputting two times brighter screens.

Technical Solution

One aspect of the present disclosure provides a display device including a backlight unit; a liquid crystal panel configured to create an image by passing or blocking light emitted from the backlight unit; and a controller configured to control the backlight unit and the liquid crystal panel, wherein the liquid crystal panel includes a first color film in at least one of red, green, and blue colors, a second color film in a mixture of at least two of red, green, and blue colors, and a white film.

The backlight unit may include a light source emitting light to the liquid crystal panel, the light source emitting at least one of red, green, and blue colors of light.

The controller may be configured to control the light source to emit at least one of cyan, magenta, and yellow colors of light.

The controller may be further configured to control the light source to emit blue light and then cyan light.

The controller may be further configured to control the light source to emit green light and then cyan light.

The first color film may include a blue film and the second color film may include a yellow film.

The first color film may include a green film and the second color film may include a magenta film.

The backlight unit may further include a light emitting module in which first and second light sources emitting different colors of light are arranged, and when the first light source emits magenta light, the second light source may emit cyan light.

Furthermore, when the first light source emits yellow light, the second light source may emit cyan light.

The controller may be further configured to control the light source to emit at least one color of light in a predetermined ratio when the light source emits the at least one color of light among the red, green, and blue colors of light.

The controller may be further configured to control the light source to emit magenta light by mixing blue B and red R colors of light at a ratio of 1:2 when the light source emits at least one color of light among the red, green, and blue colors of light in the predetermined ratio.

The controller may be further configured to control the light source to emit cyan light by mixing blue B and green C colors of light at a ratio of 1:2 when the light source emits at least one color of light among the red, green, and blue colors of light in the predetermined ratio.

The controller may be further configured to control the light source to selectively emit magenta light and cyan light by mixing at least one of the red, green, and blue colors of light.

The controller may be further configured to control the light source to selectively emit yellow light and cyan light by mixing at least one of the red, green, and blue colors of light.

The backlight unit may further include a reflecting sheet for absorbing rays emitted from the light source and reflecting non-absorbed rays.

Advantageous Effects

According to the present disclosure, a display device may include a backlight unit for providing two or more different colors of light and a liquid crystal panel for efficiently transmitting the light to produce the colors, and configure a color filter included in the liquid crystal panel differently from the conventional technology in order to have three times higher efficiency as compared to the conventional RGB sub-pixel structure and further improve the efficiency by outputting two times brighter screens with the same power.

DESCRIPTION OF DRAWINGS

FIG. 1 shows the exterior of a display device, according to an embodiment;

FIG. 2 is an exploded view of a display device, according to an embodiment;

FIG. 3 is a side cross-sectional view of a pixel included in a liquid crystal panel of a display device, according to an embodiment;

FIG. 4 is an exploded view of a backlight unit, according to an embodiment;

FIG. 5 is a control block diagram, according to an embodiment of the present disclosure;

FIG. 6 is a diagram for comparing three primary colors of light and pigment;

FIG. 7 is a diagram for explaining color films in a display device, according to an embodiment;

FIG. 8 is a diagram for explaining color films in a display device, according to another embodiment;

FIG. 9 is a diagram for explaining outputs in more detail, according to an embodiment of the present disclosure;

FIG. 10 is a diagram for explaining outputs, according to another embodiment of the present disclosure;

FIG. 11 is a diagram for explaining an inventive effect, according to an embodiment; and FIGS. 12 and 13 are diagrams for explaining light sources of a backlight unit, according to an embodiment.

BEST MODE

Embodiments and features as described and illustrated in the present disclosure are only preferred examples, and various modifications thereof may also fall within the scope of the disclosure.

The terminology used herein is for the purpose of describing particular embodiments only and is not intended to limit the present disclosure.

Specifically, the singular forms as herein used are intended to include the plural forms as well, unless the context clearly indicates otherwise.

It will be further understood that the terms "comprises" and/or "comprising," when used in this specification, indicate the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another.

Furthermore, the terms, such as "~part", "~block", "~member", "~module", etc., may refer to a unit of handling at least one function or operation. For example, the terms may refer to at least one process handled by hardware such as field-programmable gate array (FPGA)/application specific integrated circuit (ASIC), etc., software stored in a memory, or a processor.

Embodiments of the present disclosure will now be described in detail with reference to accompanying drawings. Throughout the drawings, like reference numerals may refer to like parts or components.

By definition, the term 'white light' as herein used refers to a mixture of red light, green light, and blue light, or a mixture of other colors of light. The term 'natural light' refers to light with all wavelengths combined in a region of visible rays.

FIG. 1 shows the exterior of a display device, according to an embodiment.

A display device 100 is a device for processing image signals received from the outside and visually presenting the processed image. In the following description, it is assumed that the display device 100 is a television (TV), but embodiments of the present disclosure are not limited thereto. For example, the display device 100 may be implemented in various forms, such as a monitor, a portable multimedia device, a portable communication device, and any device capable of visually presenting images.

As shown in FIG. 1, the display device 100 may include a main body 101, a screen 102 for displaying an image I, and a supporter 103 arranged under the main body 101 for supporting the main body 101.

The main body 101 forms the exterior of the display device 100, and may include parts for the display device 100 to display the image I or perform various functions. Although the main body 101 of FIG. 1 is shaped like a flat plate, it is not limited thereto.

For example, the main body 101 may have a curved form with left and right ends relatively coming forward and the other parts curved backward.

The screen 102 may be formed on the front of the main body 101 for displaying visual information, i.e., the image I. For example, the screen 102 may display still or moving images as two dimensional (2D) plane images or three dimensional (3D) stereographic images using binocular parallax.

A plurality of pixels P are formed on the screen 102, and the image I to be displayed on the screen 102 may be formed by the light emitted by the pixels P. A still image I may be formed on the screen 102 by a combination of light emitted by the plurality of pixels P like a mosaic.

Each of the plurality of pixels P may emit light with various brightnesses and various colors, and the pixels may typically include red color R, green color G, and blue color B.

The term pixel as herein used refers to a dot, which is the smallest unit of an image. Accordingly, the screen 102 is comprised of a set of pixels.

In the conventional screen 102 such as the liquid crystal display, i.e., LCD, a pixel consists of three sub-pixels shaped like vertical bars.

The conventional sub-pixels are made up of red R, green G, and blue B, i.e., three primary colors of light. In other words, a single pixel represents every color with the three primary colors of light, Red R, Green G, and blue B.

Specifically, the red sub-pixel R emits red light of various levels of brightness; the green sub-pixel G emits green light of various levels of brightness; the blue sub-pixel B emits blue light of various levels of brightness. The red light has a wavelength ranging from about 620 nanometer (nm, which is one in a billion) to about 750 nm; the green light has a wavelength ranging from about 495 nm to about 495 nm; the blue light has a wavelength ranging from about 450 nm to about 495 nm.

The common display devices use white light emitted from the backlight unit 120 (see FIG. 2), which will be described later, to selectively or sequentially output red, green, and blue colors of light from a single pixel P. As a result, the screen 102 represents the image I for human eyes by mixing the rays output from the single pixel.

In this regard, with the vertical bar-shaped sub-pixels using the color elements, i.e., R, G, B, the traditional display device uses a scanning method to render a signal in each line. In other words, red, green, and blue colors of light are each emitted in a signal from a single pixel.

In this case, the light output from the single pixel only uses ⅓ of the output light emitted from the backlight unit 120 as will be described later. For example, if a pixel is to output red light through the red sub-pixel R, only ⅓ of the output light emitted from the backlight unit 102 is used.

Accordingly, an embodiment of the present disclosure provides a display device with improved efficiency by making a change on the sub-pixel and backlight light.

In the meantime, the supporter 103 of FIG. 1 may be installed under the main body 101 for supporting the main body 101 to stay in a stable position on the bottom floor. Alternatively, the supporter 103 may be installed on the back of the main body 101 to fix the main body 101 firmly onto the wall.

While the supporter 103 is shown to have a bar shape that protrudes forward from under the main body 101, In FIG. 1, it is not limited thereto but may have any shape that may stably support the main body 101.

FIG. 2 is an exploded view of a display device, according to an embodiment.

Referring to FIG. 2, the main body 101 may include many different kinds of components to create the image I on the screen 102. Specifically, the main body 101 may include a backlight unit 120 for producing and emitting sheet light forward, and a liquid crystal panel 110 for creating the image I with the light emitted from the backlight unit 120.

The main body 101 may also include a front chassis 101a, a back chassis 101b, and a mold frame 101c to support and fix the liquid crystal panel 110 and the backlight unit 120.

The front chassis 101a is shaped like a plate with an opening formed on the front, and the image I is presented through the front opening.

The back chassis 101b has the form of a box with an open front for receiving the liquid crystal panel 110 and the backlight unit 120 of the display device 100.

The mold frame 101c may be arranged between the front chassis 101a and the back chassis 101b. Specifically, the mold frame 101c may be arranged between the liquid crystal panel 110 and the backlight unit 120 to separate and fix the liquid crystal panel 110 and the backlight unit 120.

The back light unit 120 may include point light sources for emitting monochromatic light, mixtures of monochromatic colors of light, and white light, and refract, reflect, and scatter the light emitted from the point light sources to convert the light to uniform sheet light. By the refraction, reflection, and scattering of light, the backlight unit 120 may emit uniform sheet light forward.

Configuration and operation of the backlight unit 120 will be described in connection with FIG. 4.

The liquid crystal panel 110 is arranged in front of the backlight unit 120 for blocking or transmitting the light emitted from the backlight unit 120 to create the image I.

The front face of the liquid crystal panel 110 constitutes the aforementioned screen 102 of the display device 100, and is comprised of the plurality of pixels P. The plurality of pixels P included in the liquid crystal panel 110 may separately block or transmit the light from the backlight unit 120, and the light transmitted by the plurality of pixels forms the image I to be displayed on the display device 100.

The liquid crystal panel 110 has optical properties changing by electric field. Operation of the liquid crystal panel will now be described.

FIG. 3 is a side cross-sectional view of a pixel included in a liquid crystal panel of a display device, according to an embodiment.

Referring to FIG. 3, the liquid crystal panel 110 may include a first polarizer film 111, a first transparent substrate 112, a thin film transistor 113, a pixel electrode 114, a liquid crystal layer 115, a common electrode 116, a color film 117, a second transparent substrate 118, and a second polarizer film 119.

The first and second transparent substrates 112 and 118 may form the exterior of the liquid crystal panel 110, and protect the liquid crystal layer 115 and the color film 117 arranged between the first and second transparent substrates 112 and 118.

The first and second transparent substrates 112 and 118 may be formed of tempered glass or a transparent film.

On the outer surfaces of the first and second transparent substrates 112 and 118, the first and second polarizer films 111 and 119 are applied, respectively.

Light consists of a pair of electric field and magnetic field oscillating in perpendicular directions to a traveling direction of the light. The electric field and the magnetic field may oscillate in any directions that are perpendicular to the traveling direction of the light.

Such a phenomenon in which the electric field and the magnetic field oscillate in only particular directions is called polarization. Further, a film that transmits light having electric and magnetic fields oscillating in predetermined directions while blocking light having electric and magnetic fields oscillating in directions different from the predetermined directions is called a polarizer film.

In other words, the polarizer film transmits light oscillating in a predetermined polarization direction but blocks light oscillating in the other directions.

The first polarizer film 111 transmits light oscillating in a first polarization direction but blocks light oscillating in the other directions. The second polarizer film 119 transmits light oscillating in a second polarization direction but blocks light oscillating in the other directions.

The first and second polarization directions are perpendicular to each other. In other words, an oscillating direction of light transmitted by the first polarizer film 111 and an oscillation direction of light transmitted by the second polarizer film 119 are perpendicular to each other. As a result, the light in general may not penetrate both the first and second polarizer films 111 and 119 at the same time.

The color film 117 is formed on the inner side of the second transparent substrate 118.

In an embodiment of the present disclosure, the color film 117 may include a blue film 117b to pass the blue light, a yellow film 117y to pass the red light and the green light, and a white film 117w to pass all the light, and the blue, yellow, and white films 117b, 117y, and 117w may be arranged side by side.

The area, in which the color film 117 is formed, corresponds to the pixel P as described above.

Accordingly, the color film 117 has an area where the blue film 117b is formed correspond to the blue sub-pixel B and areas where the yellow and white films 117y and 117w are formed correspond to the red sub-pixel R and the white sub-pixel G, respectively.

In other words, the blue sub-pixel B, the red sub-pixel R, and the green sub-pixel G are formed by the blue film 117b, the yellow film 117y, and the white film 117w, and the combination of the blue film 117b, yellow film 117y, and white film 117w constitutes the single pixel P.

In another embodiment of the present disclosure, the color film 117 may be comprised of green G, magenta M, and white W films. This will be described later in more detail with reference to FIGS. 7a and 7b.

On the inner side of the first transparent substrate 112, the thin film transistors (TFTs) 113 are formed.

Specifically, the TFTs 113 are formed at positions corresponding to the gaps between blue, yellow, and white films 117b, 117y, and 117w. In other words, the TFTs 113 may be located between the blue, yellow Y, and white sub-pixels B, Y, and W.

The TFT 113 may control the current flowing in the pixel electrode 114, which will be described below. Specifically, depending on whether the TFT 113 is turned on (activated, closed) or turned off (deactivated, opened), an electric field may be formed or removed from between the pixel electrode 114 and the common electrode 116.

The TFT 113 may be formed of poly-silicon, and manufactured using a semiconductor process, such as lithography, deposition, or ion implantation process.

The pixel electrode 114 is formed on the inner side of the TFT 113 of the first transparent substrate 112, and the common electrode 116 is formed on the inner side of the color film 117 of the second transparent substrate 118.

The pixel electrode 114 and the common electrode 116 are formed of a conductive metal material, and may produce an electric field to change arrangement of the liquid crystal molecules 115a of the liquid crystal layer 115, which will be described below.

In this regard, the pixel electrode 114 may be formed in the regions corresponding to the blue, yellow, and white films 117b, 117y, and 117w, and the common electrode 116 may be formed on all across the panel. As a result, electric fields may be selectively produced in the regions corresponding to the blue, yellow, and white films 117b, 117y, and 117w of the liquid crystal layer 115, which will be described later.

The pixel electrode 114 and the common electrode 116 may be formed of a transparent material to transmit light incident from outside.

The pixel electrode 114 and the common electrode 116 may also be formed of indium tin oxide (ITO), indium zinc oxide (IZO), silver (Ag) nano wire, carbon nano tube (CNT), graphene, or 3,4-ethylenedioxythiophene (PEDOT).

The liquid crystal layer 115 is formed between the pixel electrode 114 and the common electrode 116, and filled with liquid crystal molecules 115a.

The liquid crystal is in an intermediate state between solid (crystal) and fluid. When heat is applied to unilateral materials, the materials are phase-changed from a solid state to a transparent liquid state at a temperature above their melting points. By contrast, when heat is applied to a liquid crystal substance in a solid state, the liquid crystal substance changes to an opaque and muddy liquid and then into a transparent liquid state. The term liquid crystal refers to a liquid crystal state, which is an intermediate state between solid and fluid, or to a material itself in the liquid crystal state.

Most liquid crystal materials are organic compounds, the molecules of which have the shape of thin and long rods or flat shapes, and the molecules have the form of crystals, in which the molecules are arranged irregularly in a direction and regularly in another direction. As a result, the liquid crystal has both fluidity of a liquid and optical anisotropy of a crystal (solid).

Furthermore, the liquid crystal even reveals an optical property depending on a change in electric field. For example, the liquid crystal may have varying directions of arrangement of molecules that form the liquid crystal, according to a change in electric field.

If an electric field is produced on the liquid crystal layer 115, the liquid crystal molecules 115a of the liquid crystal layer 115 are arranged along the direction of the electric field, and otherwise if no electric field is produced on the liquid crystal layer 115, the liquid crystal molecules 115a are arranged along an alignment layer (not shown).

As a result, the optical property of the liquid crystal panel 110 may vary depending on whether there is an electric field on the liquid crystal layer 115.

If an electric field is produced on the liquid crystal layer 115, the light polarized by the first polarizer film 111 may not penetrate the second polarizer film 119 due to the arrangement of the liquid crystal molecules 115a of the liquid crystal layer 115. In other words, the light from the pixel P on which an electric field is produced in the liquid crystal layer 115 may be blocked by the liquid crystal panel 110.

For example, if no electric field is produced on the liquid crystal layer 115, the light polarized by the first polarizer film 111 may penetrate the second polarizer film 119 due to the arrangement of the liquid crystal molecules 115a of the liquid crystal layer 115. In other words, the light from the pixel P on which no electric field is produced in the liquid crystal layer 115 may penetrate the liquid crystal panel 110.

As described above, the liquid crystal panel 110 may independently control light penetration of each pixel (more specifically, each of blue, yellow, and white sub-pixels included in the pixel). As a result, by mixture of rays from the plurality of pixels P, the image I may be displayed on the screen 102 of the display device 100.

The backlight unit 120 will now be described.

FIG. 4 is an exploded view of a backlight unit, according to an embodiment. FIG. 4 is directed to a direct-type backlight unit. However, a backlight unit of the present disclosure may also include an edge-type backlight unit in addition to the direct-type backlight unit 120.

In the embodiment of the present disclosure, the direct-type backlight unit 120 may include a light emitting module 121 for generating light, a reflecting sheet 122 for reflecting light, a diffuser plate 123 for diffusing light, and an optical sheet 124 for improving light luminance.

A plurality of light sources 121a may be uniformly located on the rearmost side of the backlight unit 120, as shown in FIG. 4, and may emit light toward the front.

Furthermore, the plurality of light sources 121a may be arranged in predetermined patterns so that the light emitted from them has as uniform brightness as possible. Specifically, the plurality of light sources 121a may be arranged such that a light source is equi-distant from its neighboring light sources.

For example, as shown in FIG. 4, the plurality of light sources may be arranged in columns and rows so that four neighboring light sources form a square. As a result, a light source is located to be adjacent to four other light sources, and the distances between the light source and the four neighboring light sources are all the same.

In another example, the plurality of light sources may be arranged in multiple rows, and a light source belonging to a row may be placed in the middle of two light sources 121a belonging to the other two rows, respectively. As a result, the plurality of light sources are arranged such that three neighboring light sources form an equilateral triangle. Furthermore, a light source is located to be adjacent to six other light sources, and the distances between the light source and the six neighboring light sources are all the same.

The arrangement patterns of the plurality of light sources 121a are not, however, limited thereto, and the plurality of light sources 121a may be arranged in various patterns such that the light emitted from the plurality of light sources 121a has as uniform luminance as possible.

In an embodiment of the present disclosure, the light sources 121a may employ devices capable of emitting monochromatic light (light having a particular wavelength, e.g., blue light) or white light (light with a mixture of various wavelengths) to various directions when powered.

For example, the light sources 121a may employ low calorific light emitting diodes (LEDs) or Cold Cathode Fluorescent Lamps (CCFL).

Especially, in a case that the light source 121a emits white light, the light source 121a may include a blue LED that emits high energy blue light and a red/green (RG) fluorescent substance that emits green and red colors of light by absorbing the blue light. In this case, the white light may be a mixture of red, green, and blue colors of light to be cyan and magenta colors of light or yellow light.

Furthermore, the light source 121a may include a blue LED that emits high energy blue light and a yellow (YAG) fluorescent substance that emits yellow light by absorbing the blue light. Moreover, the light source 121a may include the blue LED and a K2SiF6 (KSF) fluorescent substance or K2TiF6 (KTF) fluorescent substance, which has recently been developed.

In addition, the light source 121a may include a red LED that emits red light, a green LED that emits green light, and a blue LED that emits blue light, and further include a light mixing substance for mixing the respective monochromatic colors of light.

The arrangement of the light sources 121a will be described later in connection with FIGS. 12 and 13.

A supporting body 121b may fix the plurality of light sources 121a to prevent the light sources 121a from being moved. In addition, the supporting body 121b may supply power to each of the light sources 121a for light emission.

The supporting body 121b may be in the plural along with the arrangement of the plurality of light sources 121a. For example, in the case that the plurality of light sources 121a are arranged in lines, as shown in FIG. 4, there may be as many supporting bodies 121b as the number of the lines of the plurality of light sources 121a, and each of the many supporting bodies 121b may fix the light sources 121a that belong to the line.

The supporting body 121b may be formed of a synthetic resin with conductive power supply lines formed therein to fix the plurality of light sources 121a and supply power to the light sources 121a, or formed as a printed circuit board (PCB).

A reflecting film may reflect the light traveling backward from the backlight unit 120 to the front. In FIG. 4, a sheet including the reflecting film may be called the reflecting sheet 122.

Through holes 122a are formed in the reflecting sheet 122 at corresponding positions to the light sources 121a of the light emitting module 121. Furthermore, the light sources 121a of the light emitting module 121 may pass the through holes 122a and protrude forward from the reflecting sheet 122.

Since the light sources 121a may emit light from the front of the reflecting sheet 122 in many different directions, some of the light emitted from the light sources 121a may travel backward. The reflecting film of the reflecting sheet 122 may reflect the light emitted backward from the light sources 121a to the front.

The diffuser plate 123 may be arranged in front of the light emitting module 121 and the reflecting sheet 122 to uniformly diffuse the light emitted from the light sources 121a of the light emitting module 121.

As described above, the light sources 121a are located in many places on the rear side of the backlight unit 120. The light sources 121a are arranged on the rear side of the backlight unit 120 at regular intervals, and non-uniformity of brightness occurs across the places of the light sources 121a.

To eliminate the non-uniformity of brightness due to the light sources 121a, the diffuser plate 123 may diffuse the light emitted from the light sources 121a inside the diffuser plate 123. In other words, the diffuser plate 123 may receive non-uniform light from the light sources 121a and emit uniform light to the front. Specifically, the diffuser plate 123 may have the color of milk to prevent the loss of uniformity of brightness by having the light emitted from the light source 121a directly pass the diffuser plate 123, and the light transmittance of the diffuser plate 123 is about 50 to 70%.

The diffuser plate 123 may be comprised of a core to transmit and diffuse the light and a pair of skins to protect the core and diffuse the light. The core may employ poly-methyl methacrylate (PMMA) or transparent polycarbonate (PC) with a diffuser agent added thereto for light diffusion. The skins may employ poly-methyl methacrylate (PMMA) or transparent polycarbonate (PC) with a sunscreen agent added thereto for protecting the core.

The optical sheet 124 is a sheet to improve brightness and uniformity of the brightness. Specifically, the optical sheet 124 may include a diffuser sheet, a prism sheet, a double brightness enhance film (DBEF), etc.

The diffuser sheet diffuses light to improve uniformity of brightness. The prism sheet has the light diffused by the diffuser sheet focused to increase the brightness. Finally, the DBEF is also called a reflective polarizer film, which is a kind of polarizer film, capable of transmitting some of incident rays while reflecting the other rays. For example, the DBEF may transmit rays polarized in the same direction as a predetermined polarization direction and reflect rays in other directions than the polarization direction.

In addition, the backlight unit 120 may include many different sheets without limitations.

FIG. 5 is a control block diagram, according to an embodiment of the present disclosure.

Referring to FIG. 5, the display device 100 in accordance with the present disclosure may include the liquid crystal panel 110 having pixels P, a backlight unit 120 including light sources, and a controller 200 for controlling the liquid crystal panel 110 and the backlight unit 120.

The liquid crystal panel 110 may include the polarizer films 111 and 119, TFTs 113, the liquid crystal layer 115, and the color film 117, as described above in connection with FIG. 3. Furthermore, to control the liquid crystal panel 110 as will be described later, the pixel electrode 114 and the common electrode 116 may be included to receive electric signals of the controller 200.

Specifically, in accordance with an embodiment of the present disclosure, the color film 117 may be comprised of the blue film 117b, the yellow film 117y, and the white film 117w. In another embodiment of the present disclosure, the color film 117 may be comprised of green G, magenta M, and white W films.

As described above in connection with FIG. 1, the traditional display device 100 creates white light by mixture of the red R, green G, and blue B sub-pixels. However, using the red, green and blue films causes a problem of efficiency in power consumption.

Accordingly, according to the present disclosure, the liquid crystal panel 110 is comprised of the blue B, yellow Y, and white W films, or green G, magenta M, and white W films to realize the same mixtures as implemented by the red R, green G, and blue B sub-pixels. This will be described in detail later in connection with FIGS. 7 and 8.

The controller 200 controls the TFTs 113 of the liquid crystal panel 110, and more particularly, the current flowing in the pixel electrode 114. This may cause an electric field to be produced or removed from between the pixel electrode 114 and the common electrode 116, and consequently, the blue film 117b, the yellow film 117y, and the white film 117w are controlled sequentially or selectively.

As described above in connection with FIG. 4, the backlight unit 120 may include a light emitting module 121 for generating light, a reflecting sheet 122 for reflecting light, a diffuser plate 123 for diffusing light, and an optical sheet 124 for improving light luminance.

In an embodiment of the present disclosure, the controller 200 may control the light emitting module 121 that generates light in the backlight unit 120.

Specifically, the light emitting module 121 has the plurality of light sources 121a arranged in predetermined patterns to output uniform light. A single light source 121a may be configured to selectively output red light, green light, or blue light.

The controller 200 may control the single light source 121a to emit magenta light M by outputting the red R and blue B colors of light together. Subsequently, the controller 200 may control cyan C light to be emitted by outputting green G and blue B colors of light together. That is, the controller 200 may control the single light source 121a to emit magenta light M or cyan light C.

The controller 200 is a processor for controlling general operation of the display device 100. Specifically, the controller 200 may control other various components of the display device 100 than the aforementioned liquid crystal panel 110 and backlight unit 120.

The controller 200 may be incorporated in a system on chip (SOC) embedded in the display device 100, and may carry out various programs related to operation of the display device 100. The controller 200 may also include a storage function, and may be implemented with a storage chip in a type of at least one of flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), and magnetic memory.

There may be not only one but multiple SoCs embedded in the display device 100, so the aforementioned components may not be limited to being integrated in a single SoC.

The control block diagram shown in FIG. 5 is for the purposes of explanation of the present disclosure, and may include additional components required to operate the display device 100 without limitation.

FIG. 6 is a diagram for comparing three primary colors of light and pigment.

Referring to FIG. 6, (a) depicts three primary colors of light and (b) depicts three primary colors of pigment.

The rays detectable to human eyes are electromagnetic waves of about 400 to 800 nm wavelengths. These are called visible rays.

Meanwhile, the human eye sees an object and senses the color. Specifically, the light reflecting off from the object is transmitted to three kinds of cells on the retina of the human, which are sensitive to the red R, green G, and blue B colors of light, and pigments contained in the cells make chemical reactions accordingly, converting it into physical signals to be sent to the cranial nerves.

The cells feel different colors depending on stimulus values. Three colors having the most conspicuous stimulus values are called the three primary colors of light. Specifically, the three primary colors of light are red R, green G, and blue B, which are not created by any mixture of other colors of light, and many different colors of light are obtained by mixing ratios of the three colors of light. A mixture of all the three primary colors becomes white light.

An object comes in color by absorbing light in a range of visible rays. If the light reaches an object and the red R and blue B colors of light are absorbed while the green G light is reflected, the object comes in green G.

If another object absorbs only the green G light and reflects the red R and blue B colors of light, the object comes in a mixture of red R and blue B colors of light, which is magenta as shown in (a) of FIG. 6.

In other words, the magenta M light results from reflection or emission of both red R and blue B colors of light. The cyan light results from reflection or emission of both blue B and green G colors of light. Lastly, the yellow Y light is a color of light that appears when both the red R and green G colors of light are emitted.

In the meantime, in the present disclosure, the magenta light M emitted by the backlight unit 120 may be a 1:2 mixture of blue B and red R colors of light, and the cyan light C may be emitted in a 1:2 mixture of blue B and green G colors of light. This will be described in detail later in connection with FIGS. 9 and 10.

(B) of FIG. 6 depicts three primary colors of pigment. The three colors of pigment used in paint or something, unlike those of light, are cyan, magenta, and yellow, and a mixture of all these colors becomes black.

Furthermore, in the case of the pigment, many different colors may be made by mixing the three primary colors of magenta M, cyan C, and yellow Y at various ratios, but the three primary colors of pigment may not be reversely made from any mixture of other colors.

FIG. 7 is a diagram for explaining color films in a display device, according to an embodiment. FIG. 8 is a diagram for explaining color films in a display device, according to another embodiment. Overlapping descriptions will not be repeated.

Referring to FIG. 7, the liquid crystal panel 110 includes the color film 117, i.e., sub-pixels.

Specifically, the color film 117 may be comprised of blue B, yellow Y, and white W films. In FIG. 7, B, Y, W denotes colors of the color film 117.

In a graph shown on the lower side of FIG. 7, the x-axis denotes time t. This means that the present disclosure works in a color sequential driving method.

The color sequential driving method refers to a method for displaying three colors of sub-pixels, i.e., a color implementation method of the display device 100.

The color implementation method includes a space division method for displaying one of a number of sub-pixels installed on the liquid crystal panel 110 and the color sequential driving method for displaying all the sub-pixels sequentially.

To carry out the color sequential driving method, the controller 200 controls the backlight unit 120 to perform light scanning on all the pixels P, then controls the liquid crystal panel 110 to turn on the B sub-pixel and then turn off the B sub-pixel, controls the light source 121a to perform light scanning, turn on the Y sub-pixel, then turn off the Y sub-pixel, and finally controls the light source 121a again to perform light scanning and then turn on the W sub-pixel. When the pixels P are sequentially turned on in this way, the observer may recognize synthesized colors resulting from integration of colors displayed for a certain period of time, and accordingly, various colors may be represented.

In FIG. 7, the x-axis represents time sequences of the aforementioned color sequential driving.

The y-axis of FIG. 7 represents the backlight unit 120, the liquid crystal panel 110, and the outside of the screen 102 from a reference point. Specifically, 'BLU' denotes the backlight unit 120 and 'Panel' denotes the liquid crystal panel 110. 'Out' denotes rays emitted out of the screen 102.

The controller 200 controls the backlight unit 120 to emit magenta M rays at time t1.

The emitted magenta M rays penetrate the liquid crystal panel 110, the blue B film in particular. In this case, the screen 102 outputs blue B light.

Subsequently, the controller 200 controls the liquid crystal panel 110 including the yellow Y film. Specifically, the magenta M rays emitted from the backlight unit 120 penetrate the yellow Y film. The magenta M rays that have penetrated the color film 117 are emitted as red R light according to the principle of three primary colors.

The controller 200 controls the magenta M rays emitted from the backlight unit 120 to pass the white W film. In this case, the screen 102 emits magenta M light.

Subsequently, the controller 200 controls the backlight unit 120 for the light source 121a to output cyan C rays.

The cyan C rays output accordingly penetrate the blue B film to be emitted as blue B light, and penetrate the yellow Y film to be emitted as green G light according to the principle of three primary colors of light. Lastly, the cyan C rays penetrate the white W film to be emitted as the cyan C light.

Consequently, in the embodiment of the present disclosure, the light output to the outside of the screen 102 from the display device 100 is blue B, red R, magenta M, and cyan C colors of light.

The magenta M light among those output according to the principle of three primary colors of light is a mixture of red R and blue B colors of light. The cyan C light is a mixture of blue B and green G colors of light. Accordingly, the display device 100 in accordance with the present disclosure outputs red R, blue B, and green G colors like the traditional display device does.

Referring to FIG. 8, in another embodiment of the present disclosure, the color film 117 may be comprised of green G, magenta M, and white W films. In FIG. 8, G, M, W denotes colors of the color film 117.

The controller 200 controls the backlight unit 120 to emit yellow Y rays at time t1. The emitted yellow Y rays then penetrate the green G film of the liquid crystal panel 110 first. In this case, the screen 102 outputs green G light.

According to the color sequential driving method, the controller 200 controls the yellow Y rays to penetrate the magenta M film. In this case, according to the principle of three primary colors of light, the screen 102 outputs red R light. Finally, the yellow Y rays penetrate the white W film to be emitted as the yellow Y light.

The controller 200 controls the backlight unit 120 to emit cyan C rays at time t2. The emitted cyan C rays then penetrate the green G film of the liquid crystal panel 110 first. In this case, the screen 102 outputs green G light.

According to the color sequential driving method, the controller 200 controls the cyan C rays to penetrate the magenta M film. In this case, according to the principle of three primary colors of light, the screen 102 outputs blue B light. Lastly, the cyan C rays penetrate the white W film to be emitted as the cyan C light.

Like the conclusion of FIG. 7, the display device 100 in accordance with the present disclosure outputs red R, blue B, and green G colors like the traditional display device does.

This will be described in detail later in connection with FIGS. 9 and 10.

FIG. 9 is a diagram for explaining outputs in more detail, according to an embodiment of the present disclosure. FIG. 10 is a diagram for explaining outputs, according to another embodiment of the present disclosure. The embodiment will be described in connection with FIGS. 9 and 10 together to avoid overlapping explanation.

Referring to FIG. 9, in accordance with an embodiment of the present disclosure, the backlight unit 120 outputs magenta M rays. The magenta M rays output by the light source 121a of the backlight unit 120 may be created when blue B and red R colors of light are mixed at a ratio of 1:2.

As described above in connection with FIG. 7, the emitted magenta M rays penetrate the blue B film to be output as the blue B light of the magenta M rays. Specifically, the blue B light output as shown in FIG. 9 is numerically represented as ½ B.

Subsequently, according to the color sequential driving method, the magenta M rays emitted by the light source 121a penetrate the yellow Y film to be output as red R light of the magenta M rays according to the principle of three primary colors of light. The output red color R is numerically represented as 1R.

Again, the magenta M rays emitted from the light source 121a penetrate the white W film and the entire magenta M light is output. The output magenta M light is numerically represented as ½B+1R.

In other words, in an embodiment of the present disclosure, the backlight unit 120 emits magenta M and cyan C rays sequentially. The cyan C rays output by the light source 121a of the backlight unit 120 may be created when blue B and green G colors of light are mixed at a ratio of 1:2.

The emitted cyan C rays penetrate the blue B film to be emitted as the blue B light of the cyan C rays. Specifically, the blue B light output as shown in FIG. 9 is numerically represented as ½B.

Furthermore, the emitted cyan C rays penetrate the yellow Y film to be emitted as the green G light of the cyan C rays. Specifically, the green G light output as shown in FIG. 9 is numerically represented as 1G.

Lastly, the cyan C rays that have penetrated the white W film are numerically equal to a mixture of ½B and 1R.

Consequently, all the rays that may be output in the embodiment of the present disclosure correspond to ½B, 1R, ½B, 1R, ½B, 1G, and ½B and 1G, so the total of all the rays is 2B, 2G, and 2R.

In other words, the display device 100 in accordance with the present disclosure outputs images with red R, green G, and blue B colors of light like the traditional devices do.

Referring to FIG. 10, in another embodiment of the display device 100, the liquid crystal panel 110 may include green G, magenta M, and white W films. In this case, the backlight unit 120 emits yellow Y rays.

The yellow Y rays are a mixture of green G and red R colors of light according to the principle of three primary colors of light. In the present disclosure, the yellow Y rays may be created when the green G and red R colors of light are emitted at a ratio of 1:2.

Similar to FIG. 9, the yellow Y rays emitted from the backlight unit 120 penetrate the green G film to be output as green G light of the yellow Y rays. Specifically, the output green G light is numerically represented as ½G.

The yellow Y rays emitted by the light source 121a penetrate the magenta M film to be output as the red R light of the yellow Y rays. The output red color R is numerically represented as 1R.

The emitted yellow Y rays penetrate the white W film to be output entirely as the yellow Y light. The output yellow Y light is numerically represented as ½B+1R.

Similar to FIG. 9, in the embodiment of the present disclosure, the backlight unit 120 selectively outputs yellow Y and cyan C rays. The cyan C rays output by the light source 121a of the backlight unit 120 may be created when green G and blue B colors of light are mixed at a ratio of 1:2.

The emitted cyan C rays penetrate the green G film to be output as the green G light of the cyan C rays. Specifically, the green G light output as shown in FIG. 9 is numerically represented as ½G.

The emitted cyan C rays penetrate the magenta M film to be output as the blue B light of the cyan C rays. Specifically, the blue B light output as shown in FIG. 9 is numerically represented as 1B.

Lastly, the cyan C rays that have penetrated the white W film numerically correspond to ½G and 1B.

Consequently, all the rays that may be output in the embodiment of the present disclosure correspond to ½G, 1R, ½G, 1R, ½G, 1B, and ½G and 1B, so the total of all the rays is 2B, 2G, and 2R.

In other words, the display device 100 in accordance with the present disclosure outputs images with red R, green G, and blue B colors of light like the traditional devices do. However, unlike the traditional display devices, the present disclosure may reduce power consumption with increased efficiency. This will be described later with reference to FIG. 11.

FIG. 11 is a diagram for explaining an inventive effect, according to an embodiment.

As described above, the display device 100 in accordance with an embodiment of the present disclosure may include the liquid crystal panel 110 with blue B, yellow Y, and white W films installed thereon. Furthermore, as described above in connection with FIGS. 7 and 8, if the magenta M rays are emitted from the backlight unit 120 and incident onto the liquid crystal panel 110, the respective color films 117 of the display device 100 output blue B, red R, and magenta M colors.

This situation will be described in connection with FIG. 11, in which the entire output of the magenta M rays emitted from the backlight unit 120 is represented as 1.

The magenta M light is a mixture of blue B and red R, so the extent to which the magenta M light penetrates the blue B film corresponds to a half of the entire output. In other words, the transmittance of the blue B film is ½. Likewise, the transmittance of the yellow Y film is also ½. Lastly, the white W film emits the entire magenta M light, so the transmittance of the white W film is 1.

Accordingly, if the backlight unit 120 outputs the magenta M rays, the transmittance of each sub-pixel emitting the output light is ⅔ on average.

In the meantime, if the backlight unit 120 outputs cyan C rays, the transmittance of the blue B film is ½. Likewise, the transmittance of the yellow Y film is also ½. Lastly, the white W film emits the entire magenta M light, so the transmittance of the white W film is 1.

Even in the case that the backlight unit 120 outputs cyan C rays, the transmittance of a sub-pixel is ⅔. Specifically, the total transmittance of a single pixel P in the display device 100 that selectively outputs magenta M or cyan C light is ⅔.

Meanwhile, the traditional display device is equipped with red R, green G, and blue B films. If it is assumed that white light output from the backlight unit 120 is 1, a single pixel P to output red R light has ⅓ transmittance.

By contrast, the display device 100 in accordance with the present disclosure has an effect of increasing the efficiency from ⅓ to ⅔ while outputting the same red R, blue B, and green G colors as the traditional device. Consequently, the display device 100 displays two times brighter screen.

FIGS. 12 and 13 are diagrams for explaining light sources of a backlight unit, according to an embodiment.

As described above, in the display device 100 in accordance with the present disclosure, the backlight unit 120, specifically, the light emitting module 121 may include a plurality of light sources 121a corresponding to the respective pixels P.

The light sources 121a may emit magenta M and cyan C colors of light or yellow Y and cyan C colors of light.

In FIG. 12, a single light source 121a may emit red R, green G, and blue B colors of light, sequentially or selectively.

For example, if a single light source 121a is controlled to emit green G and blue B colors of light, cyan C light is output. Furthermore, if red R and blue B colors of light are emitted, the light source 121a outputs magenta C light. Lastly, if red R and green G colors of light are emitted, the light source 121a may emit yellow Y light.

Referring to FIG. 13, the display device 100 in accordance with another embodiment of the present disclosure may emit magenta M or cyan C color of light from a single light source 121a included in the backlight unit 120.

If the sub-pixels of the liquid crystal panel 110 include green G, magenta M, and white W films, a single light source 121a included in the backlight unit 120 may emit yellow Y or cyan C color of light.

The arrangements of the light sources 121a as shown in FIGS. 12 and 13 are only by way of example and are not limited thereto.

The invention claimed is:

1. A display device comprising:
   a backlight unit comprising:
      a red Light Emitting Diode (LED);
      a green LED; and
      a blue LED;
   a liquid crystal panel configured to create an image by transmitting or blocking light emitted from the backlight unit; and
   a controller configured to control the backlight unit and the liquid crystal panel,
   wherein the liquid crystal panel comprises:
      a first color film of at least one of red, green, and blue colors;
      a second color film of a mixture of at least two of red, green, and blue colors; and
      a white film, and
   wherein the controller is further configured to:
      control the backlight unit to emit magenta light or yellow light by simultaneously controlling the red LED and the green LED, or by simultaneously controlling the red LED and the blue LED, and
      sequentially control the backlight unit to emit cyan light by simultaneously controlling the green LED and the blue LED.

2. The display device of claim 1, wherein the controller is configured to control the backlight unit to emit magenta light and then cyan light.

3. The display device of claim 1, wherein the controller is configured to control the backlight unit to emit yellow light and then cyan light.

4. The display device of claim 1, wherein the first color film comprises a blue film and the second color film comprises a yellow film.

5. The display device of claim 1, wherein the first color film comprises a green film and the second color film comprises a magenta film.

6. The display device of claim 1, wherein the controller is configured to control the backlight unit to emit at least one color of light in a predetermined ratio by controlling at least two the red LED, the green LED and the blue LED.

7. The display device of claim 6, wherein the controller is configured to control the backlight unit to emit magenta light by mixing blue B and red R colors of light at a ratio of 1:2.

8. The display device of claim 6, wherein the controller is configured to control the backlight unit to emit cyan light by mixing blue B and green G colors of light at a ratio of 1:2.

9. The display device of claim 1, wherein the controller is configured to control the backlight unit to selectively emit one of magenta light and cyan light by mixing at least two of the red, green, and blue colors of light.

10. The display device of claim 1, wherein the controller is configured to control the backlight unit to selectively emit one of yellow light and cyan light by mixing at least two of the red, green, and blue colors of light.

11. The display device of claim 1, wherein the backlight unit further comprises a reflecting sheet absorbing the light emitted from the LEDs and reflecting the non-absorbed light.

* * * * *